United States Patent
Sindhu et al.

(10) Patent No.: US 9,894,427 B2
(45) Date of Patent: Feb. 13, 2018

(54) METHODS AND APPARATUS FOR A FLATTENED DATA CENTER NETWORK EMPLOYING WAVELENGTH-AGNOSTIC ENDPOINTS

(71) Applicant: Juniper Networks, Inc., Sunnyvale, CA (US)

(72) Inventors: Pradeep Sindhu, Los Altos Hills, CA (US); Roberto Marcoccia, San Jose, CA (US); Theodore J. Schmidt, Gilroy, CA (US); George R. Sosnowski, Sunnyvale, CA (US); Christian Malouin, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/938,592

(22) Filed: Nov. 11, 2015

(65) Prior Publication Data

US 2017/0134836 A1  May 11, 2017

(51) Int. Cl.
*H04J 14/02* (2006.01)
*H04Q 11/00* (2006.01)
*H04B 10/572* (2013.01)

(52) U.S. Cl.
CPC ....... *H04Q 11/0066* (2013.01); *H04B 10/572* (2013.01); *H04J 14/02* (2013.01); *H04J 14/021* (2013.01); *H04J 14/0212* (2013.01); *H04J 14/0216* (2013.01); *H04J 14/0286* (2013.01); *H04Q 11/0005* (2013.01); *H04Q 11/0071* (2013.01); *H04Q 2011/006* (2013.01);
(Continued)

(58) Field of Classification Search
CPC .................. H04B 10/27; H04B 10/572; H04Q 11/00–11/0005; H04Q 11/0062–11/0067; H04Q 2011/0037–2011/006; H04Q 2011/0064–2011/0069
USPC .............................. 398/45–57, 58, 66, 89–95
See application file for complete search history.

(56) References Cited

U.S. PATENT DOCUMENTS

| 7,684,703 B2 * | 3/2010 | Harada | .................. | H04J 14/02 398/151 |
| 8,139,940 B2 * | 3/2012 | Harada | .................. | H04J 14/02 398/151 |

(Continued)

OTHER PUBLICATIONS

Xu: "Optically Interconnected Data Center Networks", OFC/NFOEC, Mar. 4, 2012, pp. 1-3.*

(Continued)

*Primary Examiner* — Li Liu
(74) *Attorney, Agent, or Firm* — Cooley LLP

(57) ABSTRACT

In some embodiments, a system includes a set of servers, a set of switches within a switch fabric, and an optical device. The optical device is operatively coupled to the set of servers via a first set of optical fibers. Each server from the set of servers is associated with at least one wavelength from a set of wavelengths upon connection to the optical device. The optical device is operatively coupled to each switch from a set of switches via an optical fiber from a second set of optical fibers. The optical device, when operative, wavelength demultiplexes optical signals received from each switch from the set of switches, and sends, for each wavelength from the set of wavelengths, optical signals for that wavelength to the server from the set of servers.

20 Claims, 5 Drawing Sheets

(52) U.S. Cl.
CPC .............. *H04Q 2011/0016* (2013.01); *H04Q 2011/0018* (2013.01); *H04Q 2011/0086* (2013.01)

(56) References Cited

U.S. PATENT DOCUMENTS

| | | | |
|---|---|---|---|
| 8,270,830 B2* | 9/2012 | Kirkpatrick | H04Q 11/0005 385/17 |
| 8,503,879 B2* | 8/2013 | Xu | H04Q 11/0005 398/45 |
| 8,705,954 B2* | 4/2014 | Singla | H04J 14/0204 398/14 |
| 8,965,203 B1* | 2/2015 | Vandat | H04J 14/0282 385/16 |
| 9,166,692 B1* | 10/2015 | Felderman | H04B 10/27 |
| 9,332,323 B2* | 5/2016 | Zhang | H04Q 11/0005 |
| 9,332,324 B2* | 5/2016 | Xu | H04Q 11/0005 |
| 2004/0179855 A1* | 9/2004 | Harada | H04J 14/02 398/197 |
| 2006/0171712 A1* | 8/2006 | Tanaka | H04Q 11/0062 398/45 |
| 2012/0008945 A1* | 1/2012 | Singla | H04J 14/0204 398/49 |
| 2012/0099863 A1* | 4/2012 | Xu | H04Q 11/0005 398/49 |
| 2014/0056371 A1* | 2/2014 | Ji | H04L 27/2697 375/260 |
| 2014/0119728 A1* | 5/2014 | Zhang | H04J 14/0204 398/48 |
| 2014/0270761 A1* | 9/2014 | Xu | H04Q 11/0005 398/45 |
| 2014/0341568 A1* | 11/2014 | Zhang | H04J 14/0212 398/34 |
| 2015/0104171 A1* | 4/2015 | Hu | H04Q 11/0066 398/48 |
| 2015/0207586 A1* | 7/2015 | Xia | H04J 14/0269 398/48 |
| 2015/0296278 A1* | 10/2015 | Liu | H04J 14/0267 398/50 |

OTHER PUBLICATIONS

Kachris: "A Survey on Optical Interconnects for Data Centers", IEEE Communications Surveys & Tutorials, vol. 14, No. 4, Fourth Quarter 2012, pp. 1021-1036.*

European Search Report issued to European Patent Application No. EP 16163427, dated Jun. 3, 2016, 7 pgs.

Kachris et al., "A Survey on Optical Interconnects for Data Centers", IEEE Communications Surveys and Tutorials, Institute of Electrical and Electronics Engineers, vol. 14, No. 4, Oct. 1, 2012, pp. 1021-1036.

Xu et al., "Optically Interconnected Data Center Networks", Optical Fiber Communication Conference and Exposition, Mar. 4, 2012, pp. 1-3.

* cited by examiner

400

402 — Receive optical signals from a switch of a set of switches.

404 — Demultiplexes the optical signals in a set of wavelengths based on a wavelength of each optical signals.

406 — Send, for each wavelength from the set of wavelengths, optical signals for that wavelength to a server from the set of servers associated with that wavelength.

502 Receive optical signals associated with a set of wavelengths from a set of servers.

504 Multiplex, for a switch from a set of switches, optical signals received from the set of servers and associated with that switch.

506 Send to the switch the optical signals associated with the set of wavelengths.

METHODS AND APPARATUS FOR A FLATTENED DATA CENTER NETWORK EMPLOYING WAVELENGTH-AGNOSTIC ENDPOINTS

CROSS REFERENCE TO RELATED APPLICATIONS

This application is related to co-pending U.S. patent application Ser. No. 14/871,424, filed on Sep. 30, 2015, and entitled "Method and Apparatus for Self Healing of an Optical Transceiver in a Wavelength Division Multiplexing (WDM) System," the contents of which are incorporated herein by reference in its entirety.

This application is related to co-pending U.S. patent application Ser. No. 14/871,514, filed on Sep. 30, 2015, and entitled "Method and Apparatus for Remote Management of an Optical Transceiver System."

The aforementioned applications are incorporated herein by reference in their entirety.

BACKGROUND

Some embodiments described herein relate generally to methods and apparatus for a data center network. In particular, but not by way of limitation, some embodiments described herein relate to methods and apparatus for a flattened data center network employing wavelength-agnostic endpoints using wavelength tunable optical transceivers.

Presently, data centers now typically involve a collection of scale-out servers that work collectively to solve large-scale problems. This type of computing often involves extensive data exchange within the data centers, which causes a large amount of traffic to move in an east-west direction (e.g., within the same hierarchal level) within the data centers. For example, in data centers that allow dynamic migration of virtual machines, system images are transferred between original servers and new servers whenever a migration is performed. Thus, this migration of virtual machines generates substantial amount of additional data exchange. For another example, logical and/or physical centralization of storage resources, consolidation of local area network (LAN) and storage area network (SAN) networks, and increases of input/output (I/O) rates per server also contribute to significant increases in east-west traffic rates. To support such applications, it is desirable for data-center networks to provide high bandwidth and low latency with low complexity and power consumption.

Current data centers are typically built with a multi-tier architecture. Servers in a rack are connected to one or two top-of-rack (ToR) switches. These ToR switches are then connected to aggregation switches to form clusters. High-capacity aggregation routers (or core switches) are used to connect aggregation switches. At the top, core routers interconnect aggregation routers and interface with the Internet. This type of architecture, however, has several scalability problems. First, bandwidth is allocated on each layer and a certain oversubscription rate is used between layers. Oversubscription can contribute to congestion during data exchange among servers. Second, latency is introduced by multiple store-and-forward processes where queueing and processing delays take place at each switch/router on a data path. Third, this architecture typically involves complexity in wiring and control.

Accordingly, a need exists for methods and apparatus for a data center network with improved oversubscription rates, lower network latency, and simplified optical interconnect.

SUMMARY

In some embodiments, a system includes a set of servers, a set of switches within a switch fabric, and an optical device. The optical device is operatively coupled to the set of servers via a first set of optical fibers. Each server from the set of servers is associated with at least one wavelength from a set of wavelengths upon connection to the optical device. The optical device is operatively coupled to each switch from a set of switches via an optical fiber from a second set of optical fibers. The optical device, when operative, wavelength demultiplexes optical signals received from each switch from the set of switches, and sends, for each wavelength from the set of wavelengths, optical signals for that wavelength to the server from the set of servers.

BRIEF DESCRIPTION OF THE DRAWINGS

FIG. 4 is a flow chart illustrating a method of communications from switches to wavelength-agnostic servers in a data center network, according to an embodiment.

FIG. 5 is a flow chart illustrating a method of communications from wavelength-agnostic servers to switches in a data center network, according to an embodiment.

DETAILED DESCRIPTION

In some embodiments, a system includes a set of servers, a set of switches within a switch fabric, and an optical device. The optical device is operatively coupled to the set of servers via a first set of optical fibers. Each server from the set of servers is associated with at least one wavelength from a set of wavelengths upon connection to the optical device. The optical device is operatively coupled to each switch from a set of switches via an optical fiber from a second set of optical fibers. The optical device, when operative, wavelength demultiplexes optical signals received from each switch from the set of switches, and sends, for each wavelength from the set of wavelengths, optical signals for that wavelength to the server from the set of servers.

In some embodiments, each server from the set of servers includes a wavelength-tunable optical transceiver having an operational wavelength range. The operational wavelength range includes the set of wavelengths. The wavelength-tunable optical transceiver tunes to one wavelength from the set of wavelengths when the optical signals are transmitted to the server.

In some embodiments, the optical device, when operative, combines, for each switch from the set of switches, optical signals received from the set of servers and associated with that switch, each optical signal received from the set of servers associated with a wavelength from the set of wavelengths.

In some embodiments, the optical device does not switch the optical signals received from the set of switches, or the optical signals received from the set of servers. And no switch is located between the set of servers and the switch fabric.

In some embodiments, the optical device does not implement oversubscription.

In some embodiments, the optical device is not pre-provisioned and is not pre-configured before operation.

In some embodiments, each server from the set of servers includes a wavelength-tunable optical transceiver. Each server from the set of servers detects a port of the optical device upon being connected to the optical device via an optical fiber from the first set of optical fibers. Each server from the set of servers tunes its wavelength-tunable optical transceiver to the wavelength from the set of wavelengths and associated with that port of the optical device.

In some embodiments, the set of servers and the optical device are located within a common rack.

As used herein, a module can be, for example, any assembly and/or set of operatively-coupled electrical components, and can include, for example, a memory, a processor, electrical traces, optical connectors, software (executing in hardware), and/or the like. As used herein, the singular forms "a," "an" and "the" include plural referents unless the context clearly dictates otherwise. Thus, for example, the term "an optical fiber" is intended to mean a single optical fiber or a set of optical fibers with similar functionalities.

Figure 1:
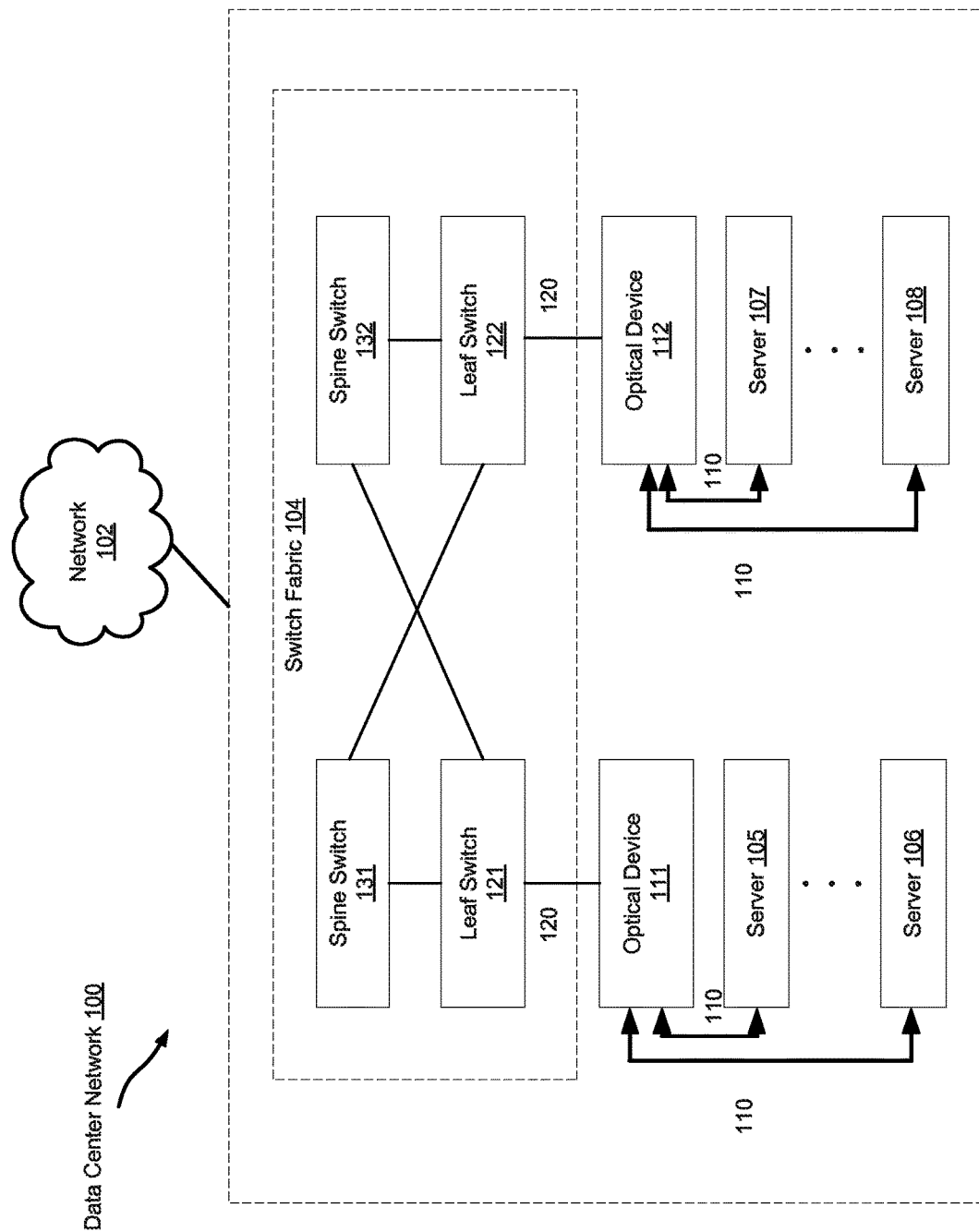
FIG. 1 is a schematic diagram illustrating a data center network, according to an embodiment.

FIG. 1 is a schematic diagram illustrating a data center, according to an embodiment. The data center 100 includes a switch fabric 104 operatively coupled to a set of optical devices 111 and 112, and a set of servers (105-106 and 107-108). In one implementation, the optical device 111 and a set of servers (e.g., servers 105 through 106) reside in close proximity (e.g., the same chassis, rack, row, or cluster). The optical device 112 and a set of computer servers (e.g., servers 107 through 108) reside in close proximity (e.g., the same chassis, rack, row, or cluster). The data center 100 can be configured to communicate to another network 102 (e.g., the internet) via its gateways (not shown in FIG. 1), leaf switches 121, 122, and/or the like, in the switch fabric 104.

One or more portions of the data center 100 can be (or can include), for example, a hardware-based module (e.g., an application-specific integrated circuit (ASIC), a digital signal processor (DSP), a field programmable gate array (FPGA)) and/or a software-based module (e.g., a module of computer code, a set of processor-readable instructions that can be executed at a processor).

The switch fabric 104 operatively couples multiple switches (such as the spine switches 131, 132 and leaf switches 121, 122) to each other and therefore data can be exchanged between servers. The switch fabric 104 also operatively couples servers (e.g., servers 105 through 106, and 107 through 108) to another network 102 (e.g., the internet). The switch fabric 104 includes a set of leaf switches 121, 122 and a set of spine switches 131, 132. Each leaf switch 121, 122 is operatively coupled to each spine switch 131, 132 in the switch fabric 104.

The leaf switches 121, 122 provide network connection points for optical devices 111, 112 via a set of optical connections 120 (e.g., optical fibers). Each leaf switch 121, 122 can be any device configured to operatively couple the optical devices 111, 112 to the switch fabric 104. In some embodiments, for example, the leaf switches 121, 122 can be edge devices, and/or the like. Structurally, the leaf switches 121, 122 can function as both source switches and destination switches. Accordingly, the leaf switches 121, 122 can send data (e.g., a data stream of data packets and/or data cells) to and receive data within the switch fabric 102, and to and from the connected optical devices 111, 112.

The leaf switches 121, 122 can be, for example, a combination of hardware modules and software modules. In some embodiments, for example, each leaf switch 121, 122 can include a field-programmable gate array (FPGA), an application specific integrated circuit (ASIC), a digital signal processor (DSP) and/or the like.

The leaf switches 121, 122 can be configured to prepare a data packet (e.g., an Ethernet packet) to enter the switch fabric 104. For example, the leaf switches 121, 122 can be configured to forward, classify, and/or modify the packet encapsulation (e.g., modify, add and/or remove a header portion, footer portion and/or any other identifier included within the data packet) of a data packet prior to sending the data packet within the switch fabric 104.

Each of the leaf switches 121, 122 is configured to communicate with each of the spine switches 131, 132. In other words, the switch fabric 104 is configured such that any-to-any connectivity is provided between the leaf switches 121, 122 and the spine switches 131, 132 at relatively low latency. For example, switch fabric 104 can be configured such that data are transmitted or conveyed between leaf switch 121 and spine switch 132.

The optical devices 111, 112 can be operatively coupled to the leaf switches 121, 122 of the switch fabric 104 using an optical connection 120 (e.g., an optical cable, an optical fiber, an optical connector). As such, the optical devices 111, 112 can aggregate and send data (e.g., data packets, data cells, etc.) to the switch fabric 104. The optical device 111 and a set of servers (e.g., servers 105 through 106) reside in close proximity (e.g., the same chassis, rack, row, or cluster). The optical device 112 and a set of computer servers (e.g., servers 107 through 108) reside in close proximity (e.g., the same chassis, rack, row, or cluster). Each server in a rack is associated with at least one wavelength of a set of wavelengths. The optical devices 111, 112 do not switch the optical signals received from the set of leaf switches 121, 122, or the optical signals received from the set of servers 105-106 and 107-108. In other words, no switch is located between the set of servers 105-106, 107-108 and the switch fabric 104. In one implementation, the optical device 111, 112 is not pre-provisioned and is not pre-configured before operation. The details of the optical devices 111, 112 are discussed with regards to FIG. 2.

The optical device 111, 112 can receive optical signals from a set of leaf switches 121, 122. Such optical signals are destined to one or multiple server(s) 105-106, 107-108 operatively coupled to the optical device 111, 112. The optical signals destined to each server 105-106, 107-108 are associated with a wavelength from a set of wavelengths for that server. An optical demultiplexer included in the optical device 111, 112 wavelength demultiplexes optical signals received at the optical device 111, 112 based on the wavelengths associated with the optical signal. For each wavelength associated with each server 105-106, 107-108, the optical device 111, 112 send the optical signals for that wavelength to the server associated with that wavelength via optical fibers.

The optical device 111, 112 can receive, via a set of optical fibers, optical signals at various wavelengths from a set of servers 105-106, 107-108 that are operatively coupled to the optical device 111, 112. The optical signals carrying data packets are to be transmitted via a set of switches 121, 122 in a switch fabric 104 and are destined to other end-points in the data center or to another network. An optical multiplexer in the optical device 111, 112 combines optical signals received from the set of servers for each switch 121, 122 to produce combined optical signals. The optical device 111, 112 forwards the combined optical signals to that switch. The switch 121, 122 receives the optical signals carrying data packets, and routes the data packets through the switch fabric 104, based on a destination address (e.g., a media access control (MAC) address, an internet protocol (IP) address, and/or the like) of each data packet.

The servers 105 through 106 are operatively coupled to the optical device 111 in close proximity (e.g., the same chassis, rack, row, or cluster) via a set of optical connections 110 (e.g., an optical cable, an optical fiber, an optical connector). The servers 107 through 108 are operatively coupled to the optical device 112 in close proximity (e.g., the same chassis, rack, row, or cluster) via a set of optical connections 110 (e.g., an optical cable, an optical fiber, an optical connector). The servers 105 through 106 and 107 through 108 can be general-purpose computational engines that can include, for example, processors, memory, and/or one or more network interface devices (e.g., a network interface card (NIC)). In some embodiments, the processors within a server 105 through 106 and 107 through 108 can be part of one or more cache coherent domains.

In some embodiments, for example, the servers 105-106 and 107-108 include computer servers, host devices, storage devices, gateways, workstations, and/or the like. In some embodiments, one or more of the servers 105-106 and 107-108 can have virtualized resources such that any server 105-106 and 107-108 (or a portion thereof) can be substituted for any other servers 105-106 and 107-108 (or a portion thereof) within the data center 100.

Each server from the servers 105-106 and 107-108 includes a wavelength-tunable optical transceiver. Before a server 105-106 and 107-108 is connected to an optical device 111, 112, the wavelength-tunable optical transceiver can tune its wavelength to any wavelength from a set of wavelengths (e.g., a set of predefined wavelengths). Each optical signal for a given server is associated with a single wavelength from a set of wavelengths. Each server (e.g., server 105) can send/receive multiple optical signals associated with multiple wavelengths from the set of wavelengths. The multiple wavelengths are within a passband range of an optical multiplexer (e.g., 244 in FIG. 2) and an optical demultiplexer (e.g., 242 in FIG. 2) in each server. Upon connecting the servers 105-106 and 107-108 to a port of an optical device 111, 112 via an optical fiber 110, each server 105-106 and 107-108 can tune its wavelength-tunable optical transceiver to a wavelength from the set of wavelengths. Such wavelength from the set of wavelengths is associated with that port of the optical device 111, 112. In other words, each port of each optical device 111, 112 is associated with a wavelength from the set of wavelengths and each server (105-106 and 107-108) for that optical device 111, 112 tunes to the wavelength for the port to which it is connected. In some embodiments, the set of wavelengths associated with a rack (or an optical device) can be the same set of wavelengths associated with a different rack (or a different optical device). Each wavelength within the set of wavelengths is, however, associated with each server within that rack. The details of the servers 105-106 and 107-108 are discussed with regards to FIG. 3.

In use, a data packet (e.g., an optical signal) can be sent between servers 105-106 and 107-108 via the switch fabric 104. For example, a data packet can be sent from the server 105 to the server 108 via the switch fabric 104, or to another network 102 via the switch fabric 104. Specifically, a data packet, originated at, for example, a process of the server 105, can be an electronic signal. A wavelength tunable optical transceiver included in the server 105 converts the electronic signal to an optical signal. The server 105 then sends the optical signals at a wavelength (e.g., a first wavelength) to the optical device 111 via an optical fiber 110. In addition, the server 106 can also convert an electronic signal containing a data packet to an optical signal and send to the optical device 111 at a different wavelength (e.g., a second wavelength) via an optical fiber 110. An optical multiplexer (e.g., 244 in FIG. 2) in the optical device 111 combines (or aggregates) optical signals received from the servers 105-106 and forwards the combined optical signals to the leaf switch 121 via an optical fiber 120. In one implementation, the leaf switch 121 includes an optical transceiver, which converts the combined optical signals to electronic signals. The leaf switch 121 then routes the electronic signals carrying the data packets within the switch fabric 104, based on the destination address of each data packet.

In this example, the destination of the data packets sent from the servers 105-106 is the server 108. Based on the destination address of the server 108, the leaf switch 121 routes the data packets within the switch fabric 104 to the leaf switch 122. In one implementation, an optical transceiver included in the leaf switch 122 can convert the electronic signals carrying the data packets to optical signals. The optical signals destined to server 108 are associated with a wavelength (e.g., a third wavelength) from a set of wavelengths for the server 108. Such third wavelength was associated with the server 108 upon being connected to the optical device 112. The optical signals destined to the other server 107 are associated with a different wavelength (e.g., a fourth wavelength) from the set of wavelengths for the server 107. The optical signals destined to the servers 107-108 are operatively coupled to the optical device 112 via an optical fiber 120. An optical demultiplexer included in the optical device 112 wavelength demultiplexes optical signals received at the optical device 112 based on the wavelengths associated with the optical signals. The optical device 112 operatively couples to each server an optical signal at a wavelength from the set of wavelengths received from the switch fabric 104. Specifically in this example, the optical demultiplexer in the optical device 112 demultiplexes optical signals destined to servers 107-108 based on the wavelengths associated with the servers 107-108. The optical device 112 then forwards the optical signals with the third wavelength and the fourth wavelength received from the servers 105-106 and destined to server 107 to server 108, respectively.

Figure 2:
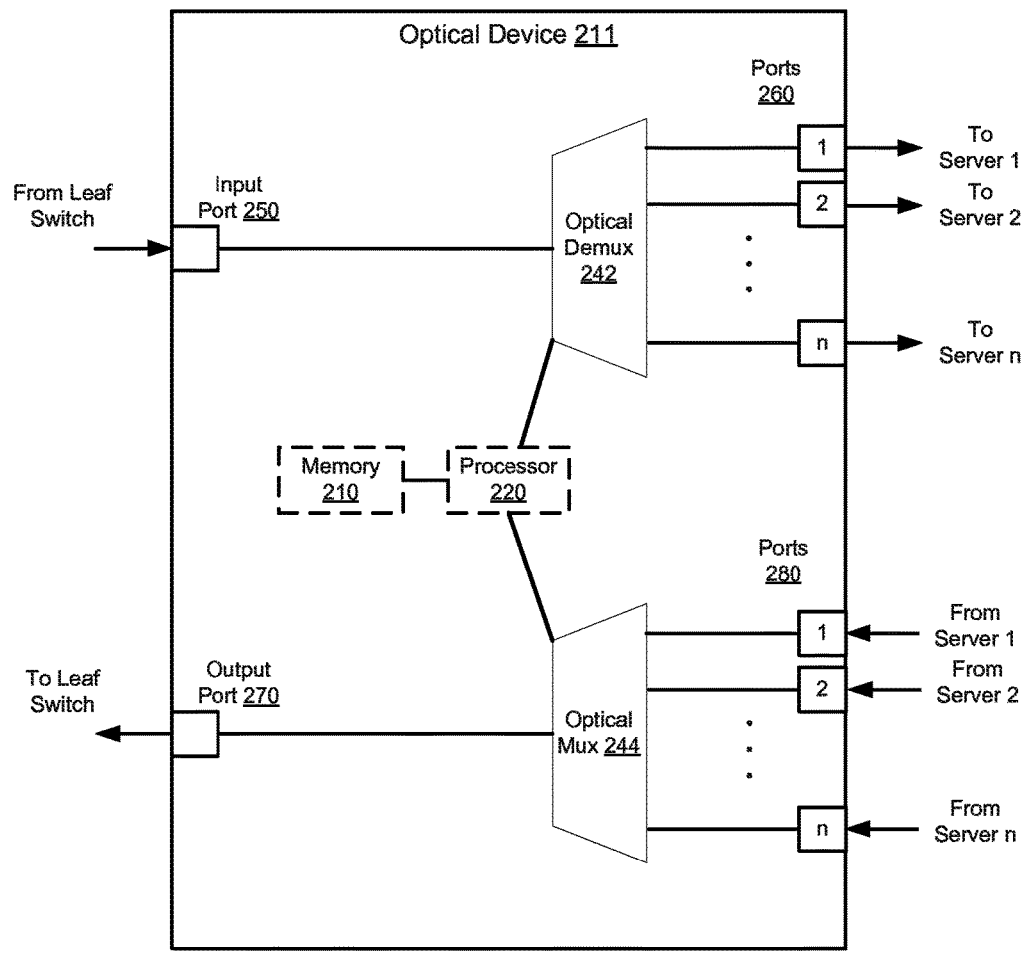
FIG. 2 is a block diagram illustrating an optical device, according to an embodiment.

FIG. 2 is a block diagram illustrating an optical device, according to an embodiment. Similar to the optical devices 111 and 112 shown in FIG. 1, the optical device 211 can be operatively coupled to a leaf switch (such as the leaf switch 121 or 122 in FIG. 1) through a pair of optical fibers. The optical device 211 receives at input port 250 a set of optical signals, each associated with a wavelength from a set of wavelengths, from the leaf switch via one of the pair of optical fibers. The optical device 211 demultiplexes the set of optical signals with the set of optical wavelengths and routes each optical signal to a port 260 on the optical device 211.

A server (such as the servers 105-106 and 107-108 in FIG. 1) is operatively coupled to the port of the optical device 211 via an optical fiber. The server detects the wavelength of the optical signal received from the optical device 211 and transmits an optical signal back to the optical device 211 at a substantially similar wavelength via a second optical fiber.

The wavelength of the optical signal received form the optical device 211 and the substantially similar wavelength of the optical signal sent back to the optical device 211 are within a passband range of an optical multiplexer (e.g., 244 in FIG. 2) and an optical demultiplexer (e.g., 242 in FIG. 2) in each server. The second optical fiber operatively couples the optical device 211 to the server. The optical device 211 multiplexes these optical signals from multiple servers, each at a wavelength (unique to the optical device 211 and the connected servers to it), via the optical multiplexer 244 and transmits the aggregated optical signal (composed of multiple wavelengths) to the leaf switch through the second optical fiber in the pair of optical fibers connecting the leaf switch and the optical device 111.

As shown in FIG. 2, the optical device 211 includes an optical demultiplexer 242, an optical multiplexer 244, an input port 250, an output port 270, a set of ports 260 and a set of ports 280. The optical device can optionally include a processor 220 and a memory 210. The processor 220, the memory 210, the optical demultiplexer 242, the optical multiplexer 244, the input port 250, the output port 270, the set of ports 260 and the set of ports 280 are operatively coupled with each other. Each module or component in the optical device 211 can be operatively coupled to each remaining module or component. Each module or component in the optical device 211 can be any combination of hardware and/or software (stored and/or executing in hardware) capable of performing one or more specific functions associated with that module. In some embodiments, a module or a component in the optical device 211 can include, for example, a field-programmable gate array (FPGA), an application specific integrated circuit (ASIC), a digital signal processor (DSP), and/or the like.

The memory 210 can be, for example, a random-access memory (RAM) (e.g., a dynamic RAM, a static RAM), a flash memory, a removable memory, a hard drive, a database and/or so forth. In some implementations, the memory 210 can include (or store), for example, a database, process, application, virtual machine, and/or some other software modules (stored and/or executing in hardware) and/or hardware modules configured to execute a wavelength-agnostic optical transmitting and receiving process and/or one or more associated methods for the wavelength-agnostic optical transmitting and receiving. In such implementations, instructions for executing the wavelength-agnostic optical transmitting and receiving process and/or the associated methods can be stored within the memory 210 and executed at the processor 220.

The processor 220 can be configured to, for example, write data into and read data from the memory 210, and execute the instructions stored within the memory 210. The processor 220 can also be configured to execute and/or control, for example, the operations of the optical demultiplexer 242, the optical multiplexer 244, and the set of ports 250. In some implementations, based on the methods or processes stored within the memory 210, the processor 220 can be configured to execute a wavelength-agnostic optical transmitting and receiving process, as described in FIGS. 4-5.

The optical demultiplexer 242 can be configured to demultiplex the optical signals based on their wavelengths. In other words, the optical demultiplexer 242 can split an optical signal into multiple optical signals, each of which is associated with a wavelength.

The optical multiplexer 244 is a hardware device that can, for example, multiplex and route different channels of light or optical signals into or out of, for example, a single mode fiber (SMF). The optical multiplexer 244 can be configured to multiplex (or combine or aggregate), for example via wavelength-division multiplexing (WDM) technology, multiple optical signals into a combined optical signal over a shared optical medium (e.g., an optical fiber).

The set of ports 260 and the set of ports 280 included in the optical device 211 operatively couple server 1-server n (such as the servers 105-106 and 107-108 in FIG. 1) with the optical device 211 via a set of optical connections (e.g., optical fibers). Each optical signal from a set of optical signals received from and/or sent by each server (e.g., server 1-server n) is associated with a wavelength. Each server from server 1-server n can operate at any wavelength from the set of wavelengths prior to transmitting an optical signal.

The input port 250 and the output port 270 included in the optical device 211 operatively couple a leaf switch (such as the leaf switches 121 or 122 in FIG. 1) with the optical device 211 via a set of optical connections (e.g., optical fibers). The optical device 211 can receive optical signals with a set of wavelengths from the leaf switch through the input port 250. The optical device 211 can send optical signals with a set of wavelengths to the leaf switch through the output port 270.

In use, a set of servers are operatively coupled to the optical device 211 via the port 250 and 280. The optical device 211 is operatively coupled to a switch fabric via the input port 250 and the output port 270. For data packets received from the set of servers and destined for the leaf switch, the optical signals (carrying data packets) with a set of wavelengths are transmitted from the set of servers to the ports 280 of the optical device 211. The optical multiplexer 244 combines the optical signals with the set of wavelengths into a combined optical signal and sends the combined optical signal to the leaf switch.

For data packets that are received from the switch fabric and destined to servers connected to the optical device 211, the optical device 211 receives a combined optical signal carrying the data packets from the switch fabric via the input port 250. The optical demultiplexer 242 splits the optical signal to multiple optical signals with a set of wavelengths. Each wavelength from the set of wavelengths is associated with a server to which at least one of the data packets is destined. The optical device 211 then sends each optical signal from the multiple optical signals to the server to which the data packets is destined.

The optical device 211 does not switch the optical signals received from the set of switches, or the optical signals received from the set of servers. In other words, no switch is located between the set of servers and the switch fabric. In one implementation, the optical device 211 does not implement oversubscription. Instead, the implementation of the optical device 211 allows dedicated bandwidth from a switch to multiple servers over a shared fiber medium. In another implementation, because a wavelength tunable optical receiver included in a server can select the wavelength associated with the optical receiver itself, the optical device 211 can forward the received optical signals without advance configuration or provisioning of the optical device 211. In other words, the optical device 211 is not pre-provisioned and is not pre-configured before operation.

Figure 3:
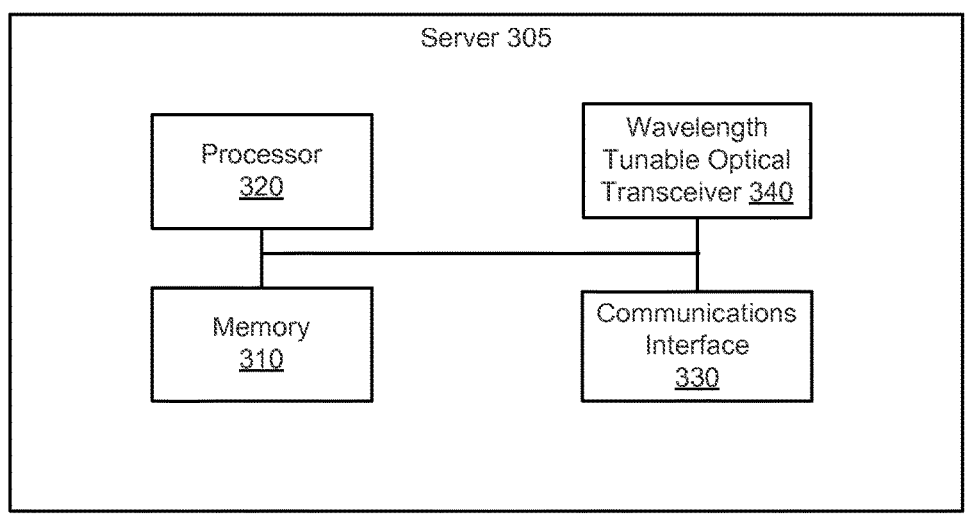
FIG. 3 is a block diagram illustrating a server, according to an embodiment.

FIG. 3 is a block diagram illustrating a server, according to an embodiment. The server 305 includes a processor 320, a memory 310, a communications interface 330, and a wavelength tunable optical transceiver 340. The processor 320, the memory 310, the communications interface 330, and the wavelength tunable optical transceiver 340 are operatively coupled with each other. Each module or component in the server 305 can be operatively coupled to each remaining module or component. Each module or component in the server 305 can be any combination of hardware and/or software (stored and/or executing in hardware) capable of performing one or more specific functions associated with that module. In some embodiments, a module or a component in the server 305 can include, for example, a field-programmable gate array (FPGA), an application specific integrated circuit (ASIC), a digital signal processor (DSP), and/or the like.

The communications interface 330 of the server 305 can include, for example, at least two ports (not shown in FIG. 3) that can be used to implement one or more wired connections (e.g., optical fibers) between the server 305. The wired connections can be, for example, fiber-optic signaling via fiber-optic cables, and/or the like. As such, the server 305 can be configured to receive data and/or send data through one or more ports of the communications interface 330, which are connected with the communications interfaces of one or more optical devices of other networks.

The memory 310 can be, for example, a random-access memory (RAM) (e.g., a dynamic RAM, a static RAM), a flash memory, a removable memory, a hard drive, a database and/or so forth. In some implementations, the memory 310 can include, for example, a database, process, application, virtual machine, and/or some other software modules (stored and/or executing in hardware) and/or hardware modules configured to execute a wavelength-agnostic optical transmitting and receiving process and/or one or more associated methods for the wavelength-agnostic optical transmitting and receiving. In such embodiments, instructions for executing the wavelength-agnostic optical transmitting and receiving process and/or the associated methods can be stored within the memory 310 and executed at the processor 320.

The processor 320 can be configured to, for example, write data into and read data from the memory 310, and execute the instructions stored within the memory 310. The processor 320 can also be configured to execute and/or control, for example, the operations of the wavelength tunable optical transceiver 340. In some implementations, based on the methods or processes stored within the memory 310, the processor 320 can be configured to facilitate executing a wavelength-agnostic optical transmitting and receiving process(es), as described in FIGS. 4-5.

The wavelength tunable optical transceiver 305 can be any high data rate optical transceiver such as, for example, an on-off-keyed (OOK) transmitter, an optical M-ary quadrature amplitude modulation (M-QAM) transmitter, an optical M-ary pulse amplitude modulation (mPAM) transmitter, a polarization multiplexed (PM) M-QAM transmitter, and/or the like. The wavelength tunable optical transceiver 305 can be configured to convert the electrical signals originated by the server 105 to optical signals. The wavelength tunable optical transceiver 305 can set (or select) the wavelength of such optical signals. In other words, the server 305 can transmit optical signals at any wavelength that is set by the wavelength tunable optical transceiver 305. The wavelength tunable optical transceiver 305 can also be configured to convert the optical signals (carrying data packets) received from an optical device (such as the optical device 111, 112 in FIG. 1 and optical device 211 in FIG. 2) to electrical signals. The processor 320 of the server 305 can process such electrical signals to perform specific operations (e.g., write the data packets into memory.)

In one implementation, the wavelength tunable optical transceiver 340 is included in a pluggable optical module that plugs into each server. The wavelength tunable optical transceiver 340 can autonomously detect and tune to the appropriate wavelength that matches the port of the optical device to which it is connected. In one implementation, the optical device can assign a wavelength to each server 305 being connected to a port of the optical device. In another implementation, the processor 320 of the server 305 can look up a table stored in a memory 310 of the server 305 to retrieve a wavelength associated with a port of the optical device. In other words, when a server 305 is connected to a port of the optical device, the server 305 can receive or determine an identifier of the port of the optical device. The server 305 can use the identifier of the port of the optical device to retrieve the wavelength associated with that port stored in a table in the memory 310 of the server 305. The server 305 can configure and tune the transmission wavelength based on the retrieved wavelength.

FIG. 4 is a flow chart illustrating a method of communications from switches to wavelength-agnostic servers in a data center network, according to an embodiment. This method can be implemented at a processor and/or a memory (e.g., processor 220 or memory 210 as discussed in FIG. 2) of an optical device. The method includes receiving optical signals from a switch of a set of switches via an optical fiber (or a set of optical fibers) at 402. As discussed above, the optical device receives optical signals that are destined to one or multiple server(s) operatively coupled to the optical device. The optical signals destined to each server are associated with at least one wavelength from a rack specified set of wavelengths for that server. An optical demultiplexer included in the optical device demultiplexes optical signals received at the optical device based on the wavelengths associated with the optical signals at 404. For each wavelength, the optical device sends the optical signals for that wavelength to the server associated with that wavelength via optical fibers at 406.

FIG. 5 is a flow chart illustrating a method of communications from wavelength-agnostic servers to switches in a data center network, according to an embodiment. This method can be implemented at a processor and/or a memory (e.g., processor 220 or memory 210 as discussed in FIG. 2) of an optical device. The method includes receiving optical signals at various wavelengths from a set of servers on a given rack via a set of optical fibers. The set of servers are operatively coupled to the optical device. The optical signals carrying data packets are to be transmitted via a set of switches in a switch fabric and are destined to other endpoints in the data center or to another network. An optical multiplexer (e.g., 244 in FIG. 2) in the optical device multiplexes optical signals received from the set of servers for a switch to produce aggregated optical signals at 504. At 506, the optical device forwards the aggregated optical signals to that switch. The switch then routes the optical signals carrying the data packets through the switch fabric, based on a destination address (e.g., a media access control (MAC) address, an internet protocol (IP) address, and/or the like) of each data packet.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or microinstructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. A system, comprising:
a plurality of servers, each server from the plurality of servers including a wavelength-tunable optical transceiver from a plurality of wavelength-tunable optical transceivers;
a plurality of switches within a switch fabric; and
an optical device including a plurality of ports, each port from the plurality of ports configured to be operatively coupled to a server from the plurality of servers via an optical fiber from a first plurality of optical fibers, each server from the plurality of servers configured to determine, based on an identifier of the port from the plurality of ports for that server, at least one wavelength from a plurality of wavelengths associated with that port from the plurality of ports of the optical device upon connection to that port from the plurality of ports of the optical device, the plurality of servers located within a first portion of a common rack having a remaining second portion mutually exclusive from the first portion, no switch located within the remaining second portion of the common rack,
the optical device operatively coupled to each switch from a plurality of switches via at least one optical fiber from a second plurality of optical fibers,
the optical device, when operative:
wavelength demultiplexes optical signals received from each switch from the plurality of switches, and sends, for each wavelength from the plurality of wavelengths, optical signals for that wavelength to the wavelength-tunable optical transceiver of that server from the plurality of servers.

2. The system of claim 1, wherein:
each wavelength-tunable optical transceiver from the plurality of wavelength-tunable optical transceivers includes an operational wavelength range, the operational wavelength range including the plurality of wavelengths,
each wavelength-tunable optical transceiver from the plurality of wavelength-tunable optical transceivers tunes to one wavelength from the plurality of wavelengths when the optical signals are transmitted to that wavelength-tunable optical transceiver from the plurality of wavelength-tunable optical transceivers.

3. The system of claim 1, wherein:
the optical device, when operative:
combines, for each switch from the plurality of switches, optical signals received from the plurality of servers and associated with that switch, each optical signal received from the plurality of servers associated with a wavelength from the plurality of wavelengths.

4. The system of claim 1, wherein:
the optical device does not switch the optical signals received from the plurality of switches,
the optical device does not switch optical signals received from the plurality of servers.

5. The system of claim 1, wherein:
the optical device does not implement oversubscription.

6. The system of claim 1, wherein:
the optical device is not pre-provisioned and is not pre-configured before operation.

7. The system of claim 1, wherein:
each server from the plurality of servers is configured to detect a port from the plurality of ports of the optical device upon being connected to that port from the plurality of ports of the optical device via an optical fiber from the first plurality of optical fibers,
each server from the plurality of servers is configured to tune its wavelength-tunable optical transceiver to the wavelength from the plurality of wavelengths and associated with that port from the plurality of ports of the optical device.

8. The system of claim 1, wherein:
the optical device is located within the remaining second portion of the common rack.

9. A system, comprising:
an optical device having a first plurality of ports and a second plurality of ports, each portion from the first plurality of ports being associated with at least one wavelength from a plurality of wavelengths, the optical device configured to be coupled to a plurality of switches from a switch fabric via the second plurality of ports; and
a plurality of servers, each server from the plurality of servers including a wavelength-tunable optical transceiver from a plurality of wavelength-tunable optical transceivers, each server from the plurality of servers configured to detect a port from the first plurality of ports of the optical device upon being connected to that port of the optical device, each server from the plurality of servers configured to tune, based on an identifier of the port of the optical device for that server, its wavelength-tunable optical transceiver to the wavelength from the plurality of wavelengths that is associated with that port of the optical device, the plurality of servers and the optical device located within a common rack, no switch located in the common rack operatively between the plurality of servers and the switch fabric.

10. The system of claim 9, wherein:

each wavelength-tunable optical transceiver from the plurality of wavelength-tunable optical transceivers has an operational wavelength range, the operational wavelength range including the plurality of wavelengths, each wavelength-tunable optical transceiver from the plurality of wavelength-tunable optical transceivers tunes to the wavelength from the plurality of wavelengths when optical signals are transmitted to the server.

11. The system of claim 9, wherein:

the optical device, when operative:
    wavelength demultiplexes optical signals received from each switch from the plurality of switches, and
    sends, for each wavelength from the plurality of wavelengths, optical signals for that wavelength to the server from the plurality of servers associated with that wavelength.

12. The system of claim 9, wherein:

the optical device, when operative:
    combines, for each switch from the plurality of switches, optical signals received from the plurality of servers and addressed to be routed through that switch; and
    sends, for each switch from the plurality of switches, to that switch the optical signals for that switch,
    a wavelength for each optical signal sent to a switch from the plurality of switches corresponding to the wavelength of that optical signal when received from a server from the plurality of servers.

13. The system of claim 9, wherein:

the optical device does not switch the optical signals received from the plurality of switches, the optical device does not switch optical signals received from the plurality of servers.

14. The system of claim 9, wherein:

the optical device does not implement oversubscription.

15. The system of claim 9, wherein:

the optical device is not pre-provisioned and is not pre-configured before operation.

16. An apparatus, comprising:

an optical device configured to be optically coupled to a plurality of servers via a plurality of ports of the optical device, each server from the plurality of servers being wavelength-agnostic before being connected to a port from the plurality of ports of the optical device and being associated with at least one wavelength from the plurality wavelengths, based on an identifier of that port from the plurality of ports, after being connected to that port from the plurality of ports of the optical device, the optical device configured to be optically coupled to each switch from a plurality of switches within a switch fabric, the plurality of servers located within a first portion of a common rack having a remaining second portion mutually exclusive from the first portion, no switch located within the remaining second portion of the common rack, the optical device, when operative and optically coupled to the plurality of servers and the plurality of switches:
    wavelength demultiplexes optical signals received from each switch from the plurality of switches, and
    sends, for each wavelength from the plurality of wavelengths, optical signals for that wavelength to the server from the plurality of servers.

17. The apparatus of claim 16, wherein:

the optical device, when operative:
    combines, for each switch from the plurality of switches, optical signals received from the plurality of servers and associated with that switch; and
    sends, for each switch from the plurality of switches, to that switch the optical signals for that switch,
    a wavelength for each optical signal sent to a switch from the plurality of switches corresponding to the wavelength of that optical signal when received from a server from the plurality of servers.

18. The apparatus of claim 16, wherein:

the optical device does not switch the optical signals received from the plurality of switches, the optical device does not switch optical signals received from the plurality of servers.

19. The apparatus of claim 16, wherein:

the optical device does not implement oversubscription.

20. The apparatus of claim 16, wherein:

the optical device is not pre-provisioned and is not pre-configured before operation.

* * * * *